Patented Aug. 11, 1931

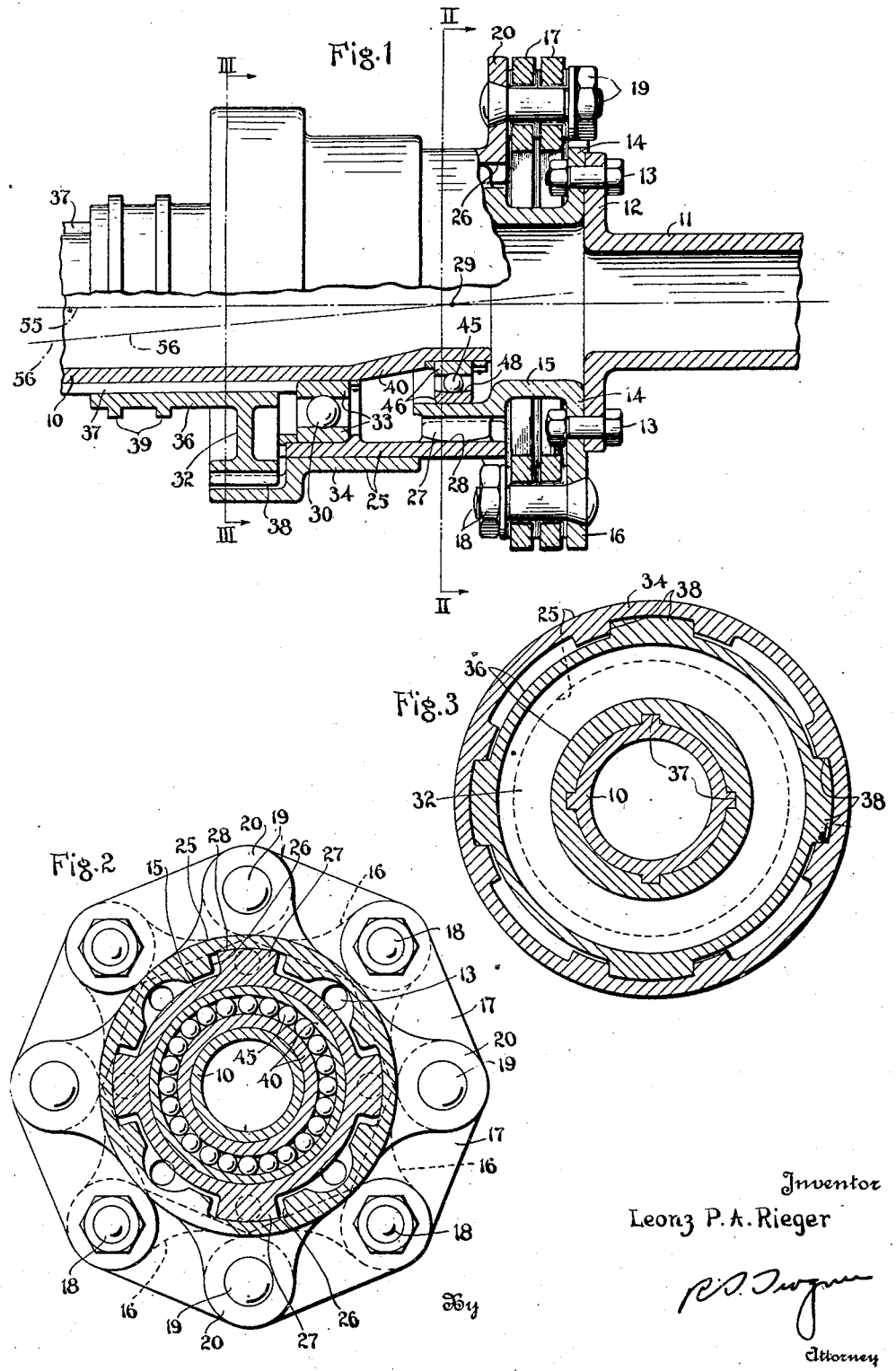

1,818,932

UNITED STATES PATENT OFFICE

LEONZ P. A. RIEGER, OF AKRON, OHIO, ASSIGNOR TO GOODYEAR-ZEPPELIN CORPORATION, OF AKRON, OHIO, A CORPORATION OF DELAWARE

TRANSMISSION SHAFT CONNECTION

Application filed June 5, 1929. Serial No. 368,518.

This invention relates to connections between elements of transmission shafts, and it has particular relation to a clutch and flexible coupling between driving and driven shafts.

One object of the invention is to provide a transmission unit in which proper alignment and operation of a clutch and coupling elements are maintained, regardless of whether or not the shafts become disaligned.

Another object of the invention is to provide connection between driving and driven shafts, wherein clutch elements may be engaged or disengaged without danger of binding or injuring any of the elements, regardless of whether or not the shafts are in axial alignment.

Flexible couplings and clutches have been employed in connecting adjacent ends of driving and driven transmission shafts, in order to provide for angular movement between the shafts in the event flexibility in the shaft connections was required. However, clutches which were provided with splined connections in such constructions were required to have considerable lost motion in order to compensate for the movement of the shafts out of coaxial alignment. If the splined connections were fitted snugly it was difficult or impossible to operate the clutches. On the other hand, if the splined connections were loosely fitted to provide for lost motion, the operation of the clutch caused excessive noise and the mechanism deteriorated very rapidly.

According to this invention, all of the clutch sections are mounted upon one of the shafts in such manner as always to be in coaxial alignment therewith. By employing this construction, no clearance is necessary, because the connections of the clutch are always in proper coaxial alignment and the splined connections can be snugly interfitted. A universally flexible coupling comprising leather, rubber, fabric or metal connects the clutch to the other shaft and permits sufficient flexibility to compensate for irregularities in axial alignment of the driving and driven shafts.

For a better understanding of the invention, reference may now be had to the accompanying drawings, forming a part of the specification, of which;

Figure 1 is a fragmentary longitudinal sectional view of a transmission unit constructed according to the invention;

Figure 2 is a cross-sectional view taken substantially along the line II—II of Figure 1; and Figure 3 is a cross-sectional view taken substantially along the line III—III of Figure 1.

In practicing the invention, a pair of shafts 10 and 11 are normally coaxially aligned, one of which is the driving shaft, and the other the driven shaft. It is immaterial for purposes of this invention as to which shaft is the driving shaft, but for the sake of convenience the shaft 10 will be designated as the driving shaft and 11 designated as the driven shaft. A flange 12, integral with the end of the shaft 11, is bolted, as indicated at 13, to a complementary flange 14 of a shaft section 15 that constitutes an end portion of the shaft 11. Radially disposed arms 16, integral with the flange 14, provide means for connecting a flexible coupling 17 which is bolted thereto, as indicated at 18. Likewise, the flexible coupling is bolted, as indicated at 19, to radially disposed arms 20 of a clutch section 25 which encircles the contiguous ends of the shafts 10 and 11.

Circumferentially disposed recesses 26 are provided about the inner portion of the clutch section 25, and lugs or splines 27, integral with the end portion 15 of the shaft 11, intermesh therewith. It will be observed that the inner peripheral surfaces, defining the recesses 26 and the outer peripheral surfaces of the lugs 27, are curved, as indicated at 28, with respect to a common radius, the center of curvature 29 being on the axes of the shafts 10 and 11. As best shown by Figure 2, the recesses 26 are sufficiently large to receive the lugs 27 loosely and to provide for slight lost motion therebetween with reference to relative rotation of the shafts 10 and 11.

An intermediate portion of the clutch section 25 is provided with roller bearings 30 that are disposed in race rings 33 secured to the shaft 10 and section 25. The end portion of the section 25, which is in the form of a sleeve 34 rigidly mounted thereon, fits over a clutch section 36 that is splined, as indicated at 37, upon the shaft 10. Interfitting splined portions 38 at the contiguous ends of the clutch sections 34 and 36 provide for a positive driving connection between the shafts 10 and 11. An integral radial flange 32 on the section 36 provides for proper relative positioning of the splined portions 38 which are closely fitted, and the axes of both clutch sections, together with the axis of the shaft 10, always coincide. Collars or ribs 39, formed on the section 36, facilitate disengagement and engagement of the sections 25 and 36 by the application thereto of a suitable operating mechanism (not shown).

A reduced portion 40 at the end of the shaft 10 is provided with a self-aligning ball bearing 45 connected thereto and to the end of the section 15 of the other shaft 11. This bearing is provided with race rings 46, one of the rings being curved, as indicated at 48, and the radius of curvature being described about the point 29.

Assuming that the axis of the shaft 11 has been deflected out of alignment from the position indicated at 55, to the position indicated at 56, the point 29, nevertheless, remains on both the axes of the shafts 10 and 11. The curved portions 28 and 48 permit angular movement of the shaft 11 with respect to the shaft 10, as well as to the clutch section 25. The splines 27 are normally inoperative but are provided for the purpose of insuring alignment of the section 25 and shaft 10, as well as to insure transmission of power between the shafts, even though the flexible coupling 17 may be accidentally disconnected or broken.

From the foregoing description, it will be apparent that the transmission unit constructed according to this invention provides for an efficiently operating and noiseless clutch mechanism without the disadvantageous effects resulting from movement of the shafts from their axially aligned position.

Although I have illustrated only one form which the invention may assume and have described that form in detail, it will be apparent to those skilled in the art that the invention is not so limited, but that various modifications may be made therein without departing from the spirit of the invention or from the scope of the appended claims.

What I claim is:

1. A transmission unit comprising a driving shaft, a driven shaft, a clutch having its members mounted coaxially upon one of the shafts, a flexible coupling connecting one clutch member to the other shaft, and a bearing connected to the adjacent ends of the shafts, the shafts being rotatable about said bearing while their axes are either coincident or angularly disposed, said clutch member and the shaft upon which the flexible coupling is mounted having splined connections therebetween.

2. A transmission unit comprising a driving shaft, a driven shaft, an aligning bearing connected to the adjacent ends of the shafts, a clutch having two force transmitting sections, means for slidably mounting one of the sections upon one of the shafts, means for rotatably mounting the other section upon the same shaft, a universal normally inoperative splined connection between said other clutch section and the other shaft, and a flexible coupling connecting said other clutch section to the last-mentioned shaft.

3. A transmission unit comprising a driving shaft, a driven shaft angularly movable with respect to the latter, a clutch including two sections mounted upon one of the shafts, means for maintaining both sections in axial alignment with respect to the last-mentioned shaft, a flexible coupling connecting one of the clutch sections to the other shaft, and means adjacent the contiguous ends of the shafts for maintaining a common fixed intersecting point of the axes of the shafts.

4. A transmission unit comprising a driving shaft, a driven shaft angularly movable with respect thereto, a clutch section having a splined connection upon the driving shaft, a second clutch section rotatably mounted upon the driving shaft and having clutching connections to the first-mentioned section, a bearing connected to the adjacent ends of the shafts, the axes of the bearing and the shafts in all positions having a common axial intersecting point, a flexible coupling connecting the second section to the driven shaft, and a splined connection between the second clutch section and the driven shaft.

5. A transmission unit comprising a driving shaft, a driven shaft normally axially disposed with respect to the driving shaft but movable angularly thereof, a clutch section slidably keyed to the driving shaft, a second clutch section having bearings upon the driving shaft, means at the contiguous ends of the shafts for maintaining the clutch sections always coaxial with respect to the driving shaft, and a flexible coupling connecting the second clutch section to the driven shaft.

In witness whereof, I have hereunto signed my name.

Signed at Akron, in the county of Summit and State of Ohio, U. S. A., this 4th day of June, 1929.

LEONZ P. A. RIEGER.